(12) United States Patent
George et al.

(10) Patent No.: US 9,945,507 B2
(45) Date of Patent: Apr. 17, 2018

(54) APPLICATOR MACHINE

(71) Applicant: PIPELINE INDUCTION HEAT LIMITED, Burnley (GB)

(72) Inventors: Michael George, Burnley (GB); Jason Montgomery, Lancashire (GB)

(73) Assignee: PIPELINE INDUCTION HEAT LIMITED (GB)

( * ) Notice: Subject to any disclaimer, the term of this patent is extended or adjusted under 35 U.S.C. 154(b) by 0 days.

(21) Appl. No.: 14/801,933

(22) Filed: Jul. 17, 2015

(65) Prior Publication Data

US 2016/0025256 A1   Jan. 28, 2016

(30) Foreign Application Priority Data

Jul. 22, 2014 (GB) .................................. 1412991.0

(51) Int. Cl.
*F16L 58/10* (2006.01)
*B05B 7/14* (2006.01)
(Continued)

(52) U.S. Cl.
CPC ........ *F16L 58/1054* (2013.01); *B05B 7/1486* (2013.01); *B05B 13/0421* (2013.01);
(Continued)

(58) Field of Classification Search
CPC  F16L 58/1054; F16L 58/1072; B05B 7/1486; B05B 13/0421; B05B 13/0436;
(Continued)

(56) References Cited

U.S. PATENT DOCUMENTS 2,648,567 A * 8/1953 Brennan .................... B05B 7/18
219/628
4,371,295 A * 2/1983 Hart .................... B05B 13/0214
251/144
(Continued)

FOREIGN PATENT DOCUMENTS

EP       2783756       10/2014
JP       43-12667    *  8/2009

OTHER PUBLICATIONS

Osaka, JP-68012667—Derwent Abstract, originally published 1968, p. 1-2.*

*Primary Examiner* — Gordon Baldwin
*Assistant Examiner* — Christina D McClure
(74) *Attorney, Agent, or Firm* — Kofi A. Schulterbrandt

(57) ABSTRACT

An applicator machine and a process for heating and coating a section of pipeline. The applicator machine includes a frame configured to rotate about a section of pipeline to be heated and coated, rotating means operable to rotate the frame, and coating material applicators induction coils and radiant heaters mounted on the frame and rotatable therewith. The induction coil is configured to heat a section of pipeline adjacent to the induction coil to a coating material application temperature. The radiant heaters are configured to heat factory-applied coatings. Each coating material applicator sprays coating material through an aperture in a respective induction coil. The applicator includes an enclosure configured to surround a section of pipeline and provision for evacuating and collecting waste coating material. The coating material applicator may be configured to spray powder coating material, such as fusion bonded epoxy powder material and/or chemically modified polypropylene powder material.

18 Claims, 14 Drawing Sheets

(51) Int. Cl.
  B05B 13/04    (2006.01)
  B05D 1/12     (2006.01)
  B05D 3/02     (2006.01)
  B05D 7/14     (2006.01)
  B05B 1/04     (2006.01)
  B05B 15/08    (2006.01)
  B05C 9/14     (2006.01)

(52) U.S. Cl.
  CPC .......... B05B 13/0436 (2013.01); B05D 7/146 (2013.01); B05D 7/148 (2013.01); B05B 1/044 (2013.01); B05B 15/08 (2013.01); B05C 9/14 (2013.01); B05D 1/12 (2013.01); B05D 3/0245 (2013.01); B05D 3/0281 (2013.01); F16L 58/1072 (2013.01)

(58) Field of Classification Search
  CPC ......... B05B 1/044; B05B 15/08; B05D 7/146; B05D 7/148; B05D 1/12; B05D 3/0245; B05D 3/0281; B05C 9/14
  USPC ........................................................ 427/543
  See application file for complete search history.

(56) References Cited

U.S. PATENT DOCUMENTS

| | | | |
|---|---|---|---|
| 4,595,607 A * | 6/1986 | Betteridge | B05C 9/14 118/307 |
| 4,698,473 A * | 10/1987 | Alcini | H05B 6/42 219/672 |
| 4,729,340 A * | 3/1988 | Zeiss | B05B 5/047 118/308 |
| 5,186,755 A | 2/1993 | Carlson | |
| 2004/0083957 A1* | 5/2004 | Latvis | B05C 9/14 118/620 |
| 2010/0254687 A1* | 10/2010 | George | F16L 13/0272 392/407 |
| 2011/0159192 A1 | 6/2011 | Daykin | |
| 2011/0315281 A1* | 12/2011 | Charest | B62D 1/195 148/567 |

* cited by examiner

APPLICATOR MACHINE

CROSS-REFERENCE TO RELATED APPLICATIONS

This application claims priority, under 35 U.S.C. § 119 (a)-(d), to UK Patent Application No. GB 14 12 991.0 filed Jul. 22, 2014, the contents of which are incorporated herein by reference in its entirety.

FIELD OF THE INVENTION

The present invention relates to an applicator machine for heating and coating a section of pipeline and a process for heating and coating a section of pipeline.

BACKGROUND OF THE INVENTION

Oil, gas and other pipelines are typically formed from multiple lengths of individual steel pipe sections that are welded together end-to-end as they are being laid. As used herein, a section of pipeline is any length of a pipeline construction whilst a pipe section is what is welded together to form the pipeline construction. To prevent corrosion or other damage to the pipe sections occurring both from the environment and during transportation, and to reduce heat loss of fluids transported by pipelines, the pipe sections are coated with one or more protective and/or insulation layers. The pipe sections are usually externally coated at a factory remote from the location in which they are to be laid. This is often referred to as factory-applied coating and it is generally more cost effective than coating pipe sections on site where they are laid. At the factory, the coating is applied to the outside of the pipe sections whereupon a short length of approximately 150 mm to 250 mm is left uncoated at either end of the pipe section.

A coating may take several different forms depending on the particular coating applicator. A conventional coating will typically comprise at least a first, or 'primer', layer, such as a fusion bonded epoxy (FBE) material, that is applied in either liquid or powdered form to the outer surface of the steel pipe section while it is being heated. To ensure a good bond between the steel pipe section and the primer layer, the pipe section is typically blast cleaned and etched with an appropriate anchor pattern. The pipe section is heated by induction heating before the primer layer is applied. The desired temperature would normally be the curing temperature of the powdered or liquid primer material. On contact with the heated pipe section surface the primer material coalesces and cures to form a continuous layer. The primer layer mainly protects against corrosion. The primer layer may be used as the sole layer in a coating or it may be supplemented with a second layer to provide additional mechanical protective and thermal insulation properties.

Polypropylene, polyethylene, and polyurethane material have good mechanical protective and thermal insulation properties and they are commonly used to coat pipelines transporting fluids at up to 140 degrees Celsius. Polypropylene, polyethylene and polyurethane are widely used in factory-applied coating for pipe sections. While curing of the primer layer is ongoing, and so as to allow the layers to bond, a second layer of polypropylene, polyethylene or polyurethane coating is applied commonly by an injection moulding technique while the steel pipe section is heated by induction heating, for instance. All but the ends of the pipe section is enclosed by a heavy duty mould that defines a cavity around the uncoated pipe section, which is subsequently filled with molten polypropylene, polyethylene or polyurethane material from an injection moulding machine in the factory. Once the second layer has cooled and solidified, the mould is removed to leave the factory-applied coating in place on the pipe section.

Optionally, if polypropylene is used as the second layer in the coating, an additional layer of chemically modified polypropylene (CMPP) material which acts as an adhesive may be applied between the primer layer and second layer during the curing time (i.e. time taken to harden or set) of the primer layer. Likewise, if polyethylene is used as the second layer in the coating, an additional layer of polyethylene material which acts as an adhesive may be applied between the primer layer and second layer during the curing time of the primer layer.

Optionally, the second layer may comprise polypropylene or polyethylene material in the form of a tape wrapped in a helix over the first primer layer during the curing time of the primer. Optionally, the second layer may comprise a sleeve of polypropylene material heat-shrunk over the first primer layer during the curing time of the primer.

The uncoated ends are necessary to enable the pipe sections to be welded together to form a pipeline in the field. A section of pipeline where the ends of adjacent pipe sections are joined by welding is known as a field joint. After welding, the exposed ends of the steel pipe sections on either side of the weld (i.e. the field joint) must be coated. Field joint coatings may be applied using techniques similar, or equivalent, to the factory-applied coating techniques. The field joint coatings have, as far as is possible, the same mechanical and thermal properties as the factory-applied coatings by using compatible thermosetting plastics. Compatibility of the factory-applied and field joint coatings permits fusion to occur between the factory-applied and the field joint coatings, thereby imparting great integrity to the coatings at the field joint section of pipeline. To assist with fusion, exposed chamfers at the ends of the factory-applied coating on the pipe sections may be re-heated during the field joint operation.

Pipelines may be constructed in a dedicated facility where the pipeline is pulled through the facility in increments equal to the length of one pipe section, as is typical for offshore subsea pipelines. With this construction process each welding, heating and/or coating operation is performed in a fixed location with the field joint sections of pieline moving into the position where the operations will be performed. With this construction process it is not always necessary to lift the equipment onto or off the pipeline.

Pipelines may be constructed in situ, where the pipe sections are welded together and field-coated in, or very close to, the position in which the pipeline will be buried, as is typical for onshore cross-country pipelines. With this construction process the equipment must be transported to each individual field joint in order to perform a welding, heating and/or coating operation to that section of pipeline. The equipment is continually lifted on and off the pipeline in order to perform the operations sequentially along the chain of field joint sections of pipeline.

Aside from the differences caused by the need to continually lift equipment for field coating on and off the pipeline, the welding, heating and/or coating features are similar to equipment for use in a dedicated facility.

A known pipeline field joint coating applicator machine is disclosed, for example, in patent publication No. WO2009/024755. In this prior art publication there is disclosed a two-frame system for mounting on a pipeline whose field joints are to be coated with liquid or powdered coating material. An induction coil encircles the first cylindrical frame and is moveable axially along the pipeline in order that selected sections of pipeline (the field joints) may be heated to a temperature at which the coating may adhere to the surface of the pipeline. After heating, the first frame is moved axially so that the heated filed joint section of pipeline is then surrounded by the second cylindrical frame which carries a rotatable coating material applicator. Rotation of the applicator about the field joint applies coating material around the circumference of that section of pipeline.

Another known pipeline field joint coating applicator machine is disclosed, for example, in patent publication No. GB 2 181 396. In this prior art publication there is disclosed an apparatus for preheating and coating a section of pipeline comprising a cylindrical frame adapted to encircle and rotate about the section of pipeline in either direction, a pair of arcuate heating sections mounted on the frame in spaced circumferential relation with each other and a pair of single-nozzle coating applicators mounted in spaced circumferential relation to each other and between the heating sections. Each heater section comprises an array of water-cooled tubes, each tube being arranged in a flat coil sandwiched between parallel plates to form a so-called 'flat pack'. The flat packs are separate elongate, longitudinally-orientated induction heaters spaced around the section of pipeline above the surface thereof adjacent to, and parallel with, the surface of the pipeline. The coating applicators are for coating material on the surface of the section of pipeline. The cylindrical frame is rotatable around the section of pipe while simultaneously applying an alternating electric current to the induction heaters to heat the section of pipeline to an application temperature for the coating material. The coating material is applied thereafter to the pre-heated section of pipeline through the material applicator while the cylindrical frame continues to rotate. The frame comprises an upper yoke section and two side yoke sections which pivot with respect to the upper yoke section, and locking means for locking the two side yoke sections together at their bottoms to compete a closure of the cylindrical frame about the pipeline.

A variety of equipment is available to coat sections of pipeline, largely aimed at reducing the time required to perform a coating process and economy of coating material, but also to help ensure a consistent application of coating material. For example, laying a pipeline typically involves coating several thousand field joints thus, even a small time saving in the time, or a small reduction in amount of coating material, required to coat each field joint can lead to significant overall cost savings. Likewise, consistent application of coating material can lead to significant improvements in coating quality and longevity.

BRIEF SUMMARY OF THE INVENTION

In an aspect of the present invention, there is provided an applicator machine for heating and coating a section of pipeline, the applicator machine comprising: a frame configured to rotate about a section of pipeline to be heated and coated; rotating means operable to rotate the frame; a coating material applicator mounted on the frame and rotatable therewith, and an induction coil mounted on the frame and rotatable therewith, wherein the induction coil is configured to heat a section of pipeline adjacent to the induction coil to a coating material application temperature and wherein the coating material applicator is arranged to spray coating material through an aperture through the induction coil.

With the applicator machine of the present invention, the pipeline need not be moved between the operations of induction heating and coating material application of a section of pipeline. These two operations are performed on the same small zone of the section of pipeline and they rotate about the pipeline together with the frame. Thus, the cycle time for operation of the applicator machine is diminished. Also, prior art applicator machines tend to overheat the steel surface to compensate for heat decay in the time between induction heating and spray coating. Advantageously, the applicator machine of the present invention need only heat the zone of the section of pipeline directly under the induction coil to the minimum coating material application temperature because the coating operation occurs simultaneously. In the field, this avoids overheating a factory-applied coating on each side of field joint section of pipeline being coated which may, because of human error, result in debonding of the factory-applied coatings which is highly undesirable. In the field and in the factory, the induction coil need only heat a shallow depth, or skin, of the section of pipeline rather than all of it. As a result, the steel of the section of pipeline heats more quickly and less energy is used. The applicator machine may be used to heat and coat a section of a pipeline construction or a section of a pipe section prior connection to a pipeline construction.

Preferably, the coating applicator is arranged to spray a strip of coating material. The strip of coating material may be arranged to make a broad sweep of coating material around the circumference of the section of pipeline being heated and coated.

Preferably, the coating material applicator comprises a plurality of spray nozzles arranged in an elongate row. This may provide a reliable and broadly even sweep of coating material as the frame rotates about a section of pipeline. This may help to avoid, as far as is possible, any overspray on the induction coil through which the coating material is sprayed. However, as the skilled person will understand, the row of spray nozzles is advantageous independently of whether the coating material spray passes through the middle of the induction coil.

Preferably, the nozzles are directed substantially orthogonal to the axis of rotation of the frame. Thus, the angle of incidence of the coating material spray with respect to the surface of the section of pipeline may be zero. In other words, the coating material spray may adopt a direct path to the section of pipeline.

Preferably, each nozzle comprises a flat slit arranged to spray coating material in a spray plane fanning out from the flat slit. The defined shape of a spray plane may facilitate neat strips of coating material upon a section of pipeline.

Preferably, the flat slit of each nozzle is rotatable. This may provide control over the shape and concentration of the coating material across the strip of coating material as it meets the section of pipeline. Rotation of the nozzles may enable calibration and optimization of overlap between adjacent spray planes. This may help to avoid uncontrolled turbulence or clusters of coating material concentrations where the spray meets the section of pipeline. In doing so, this may help to avoid undesirable coating material high/low points on the section of pipeline being coated and achieve, as near as possible, an uninterrupted smooth layer of coating material. Optional additional precision may be provided by flow regulators, one in line which each nozzle, to provide additional precision and control over the flow rate of coating material sprayed from the nozzles.

Preferably, the aperture through the induction coil is elongate in the direction of the strip of coating material. The strip of coating material may be optimized to pass the maximum amount of coating material through the aperture with the minimum of overspray on the induction coil.

Preferably, the induction coil is elongate with respect to the axis of rotation of the frame. This may provide a reliable means of heating a broad sweep of the section of pipeline.

Preferably, the induction coil has a partially cylindrical underside substantially coaxial with the axis of rotation of the frame. This may direct and concentrate the induction heating effect towards the zone of the section of pipeline being heated and coated.

Preferably, the coating material applicator and the induction heater form a heating and coating arrangement and wherein the applicator machine comprises two heating and coating arrangements each being mounted on substantially diametrically opposite sides of the axis of rotation of the frame. This may increase heating and coating capability and save time.

Preferably, the machine comprises at least one radiant heater arrangement disposed to heat factory-applied coatings. This may prepare a field joint section of pipeline for another coating layer to be bonded with the factory-applied coating in the next stage of the construction.

Preferably, each radiant heater arrangement is circumferentially displaced about the axis of rotation of the frame from the or each coating material applicator and the or each induction heater. This may avoid cluttering the frame and may evenly distribute weight about the axis of rotation of the frame.

Preferably, the machine comprises an enclosure configured to surround a section of pipeline and means for evacuating and collecting waste coating material. Coating material lost to the surrounding area, and not used to coat a section of pipeline, is a problem known as overspray. The enclosure protects the section of pipeline from cross-winds and provides a calm internal environment which helps to alleviate the problem of overspray. The enclosure provides a means for collecting stray coating material for re-cycling it for the benefit of the environment.

Preferably, the coating material applicator is configured to spray powder coating material, optionally fusion bonded epoxy powder material and/or chemically modified polypropylene powder material.

In another aspect of the present invention, there is provided a process for heating and coating a section of a pipeline, the process comprising: disposing a frame configured to rotate about a section of pipeline to be heated and coated; disposing an induction coil adjacent to the section of pipeline; directing a coating material applicator to spray coating material to the section of pipeline; rotating the frame, the induction coil and the coating material applicator as a unit around the section of pipeline while simultaneously supplying alternating electrical power to the induction coil to heat the section of pipeline; and spraying coating material through an aperture through the induction coil to the section of pipeline.

With the process of the present invention, the pipeline need not be moved between the operations of induction heating and coating material application of a section of pipeline. These two operations are performed on the same small zone of the section of pipeline as they rotate about the pipeline with the frame. Thus, the cycle time for operation of heating and coating material application is diminished.

Also, prior art induction heating and coating material application processes tend to overheat the steel surface to compensate for heat decay in the time between induction heating and spray coating. Advantageously, the process of the present invention need only heat the zone of the section of pipeline directly under the induction coil to the minimum coating material application temperature because the coating operation occurs simultaneously. In the field, this avoids overheating a factory-applied coating on each side of a field joint section of pipeline being coated which may, because of human error, result in de-bonding of the factory-applied coatings which is highly undesirable. In the field and in the factory, the induction coil need only heat a shallow depth, or skin, of the section of pipeline rather than all of it. As a result, the steel of the section of pipeline heats more quickly and less energy is used. The process may be used to heat and coat a section of a pipeline construction or a section of a pipe section prior connection to a pipeline construction.

Preferably, the process comprises directing the coating material applicator to spray a strip of coating material through an elongate aperture through the induction coil to the section of pipeline. The strip of coating material may be optimized to pass the maximum amount of coating material through the aperture with the minimum of overspray on the induction coil.

Preferably, the coating material applicator sprays coating material with a plurality of spray nozzles arranged in an elongate row. This may provide a reliable means of producing a broad sweep of coating material.

Preferably, the nozzles spray coating material in a substantially radial direction with respect to the section of pipeline. Thus, the angle of incidence of the coating material spray with respect to the surface of the section of pipeline may be substantially zero. In other words, the coating material spray may adopt a direct path to the section of pipeline.

Preferably, the induction coil heats a partially cylindrical section of pipeline elongate with respect to a longitudinal axis of the pipeline. This may direct and concentrate the induction heating effect towards the zone of the section of pipeline being heated and coated.

Preferably, the process comprises heating factory-applied coating of the section of pipeline with a radiant heater arrangement disposed upon the frame. This may prepare a field joint section of pipeline for another coating layer to be bonded with the factory-applied coating in the next stage of the construction.

Preferably, the process comprises evacuating and collecting waste coating material from an enclosure surrounding the section of pipeline. Coating material lost to the surrounding area, and not used to coat a section of pipeline, is a problem known as overspray. The enclosure protects the section of pipeline from cross-winds and provides a calm internal environment which helps to alleviate the problem of overspray. The enclosure provides a means for collecting stray coating material for re-cycling it for the benefit of the environment.

Preferably, the process comprises spraying powder coating material, optionally fusion bonded epoxy powder material and/or chemically modified polypropylene powder material.

In the description which follows reference is made to construction of the pipeline at a dedicated facility, where the pipeline moves into the position where the welding and coating operations are performed. However, an applicator machine with a hinged cylindrical frame adapted to be continually lifted on and off the pipeline and transported from one field joint to the next is also referenced.

BRIEF DESCRIPTION OF THE DRAWINGS

The present invention will now be explained, by way of example only, with reference to the accompanying drawings of which.

As mentioned above, multiple hollow cylindrical steel pipe sections are welded together to construct a pipeline. The individual lengths of pipe sections are, prior to being welded into a pipeline, normally coated at a factory remote from where the pipeline is laid.

Figure 1:
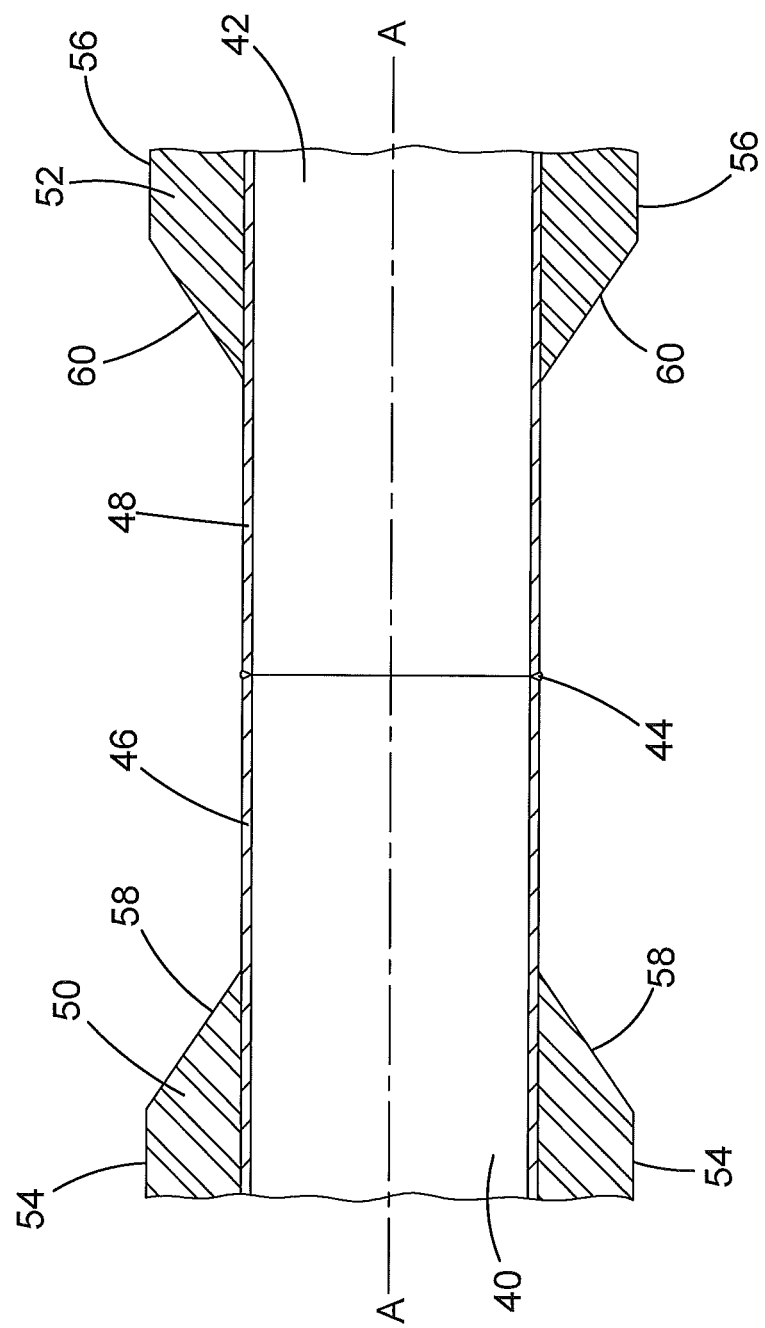
FIG. 1 shows a cross-sectional view of two joined pipe sections each with a factory coating.

Referring to FIG. 1, there are shown two steel pipe sections 40, 42 joined together in end-to-end relation by a welded joint 44 to form what is only a section of a pipeline which may extend over many kilometers. The pipe sections 40, 42 have the same central longitudinal axis A-A. Approximately, but not limited to, 150 mm to 250 mm of bare, typically blast cleaned, steel at the ends 46, 48 of the pipe sections 40, 42 enables welding of the welded joint 44. The ends 46, 48 of the pipe sections 40, 42 and the welded joint 44 are referred to as the field joint. The rest of the pipe sections 40, 42 are coated with a factory-applied coating 50, 52 of polypropylene, polyethylene or polyurethane. As mentioned above, the factory-applied technique typically comprises a first thin primer layer of FBE material. The cylindrical portions 54, 56 of the factory-applied coating 50, 52 are progressively cut back as conical chamfered portions 58, 60 in the approach to the bare steel ends 46, 48 of the pipe sections 40, 42.

Figure 2:
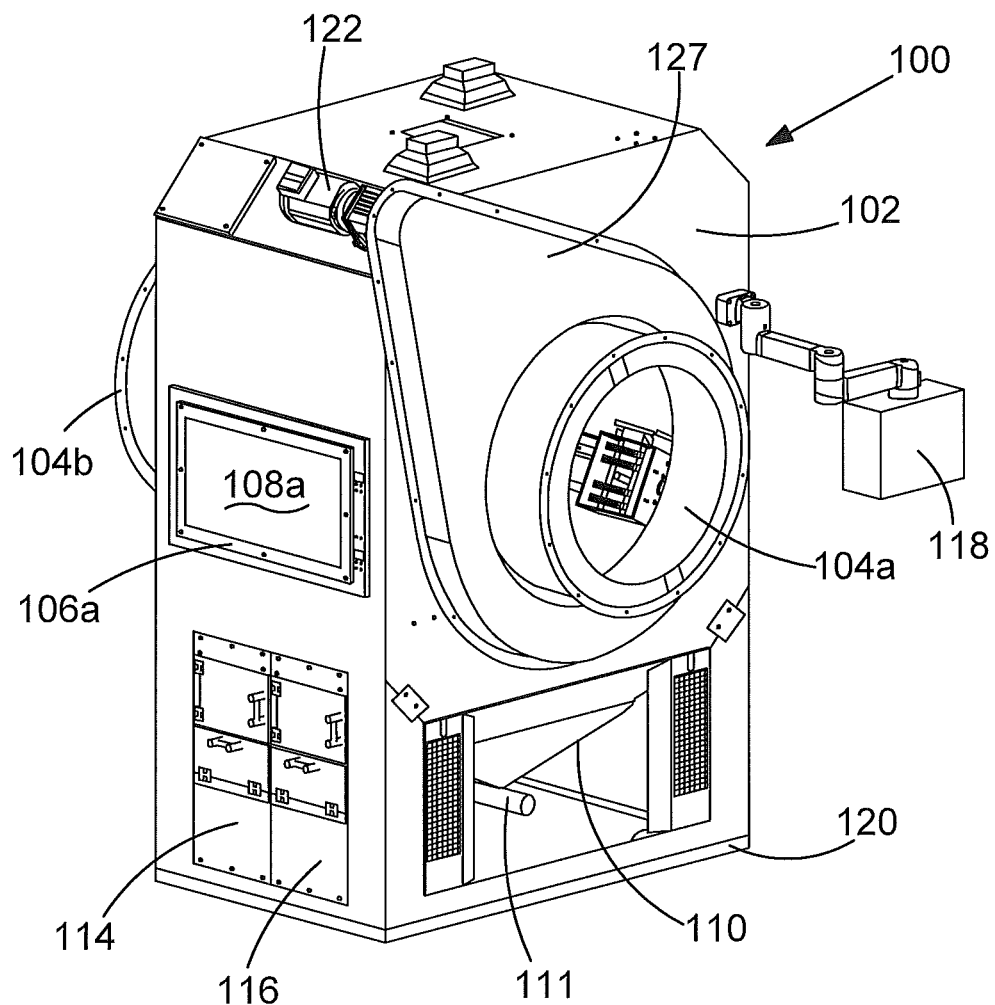
FIG. 2 shows a perspective view of an embodiment of a coating machine according to the present invention.
Figure 3:
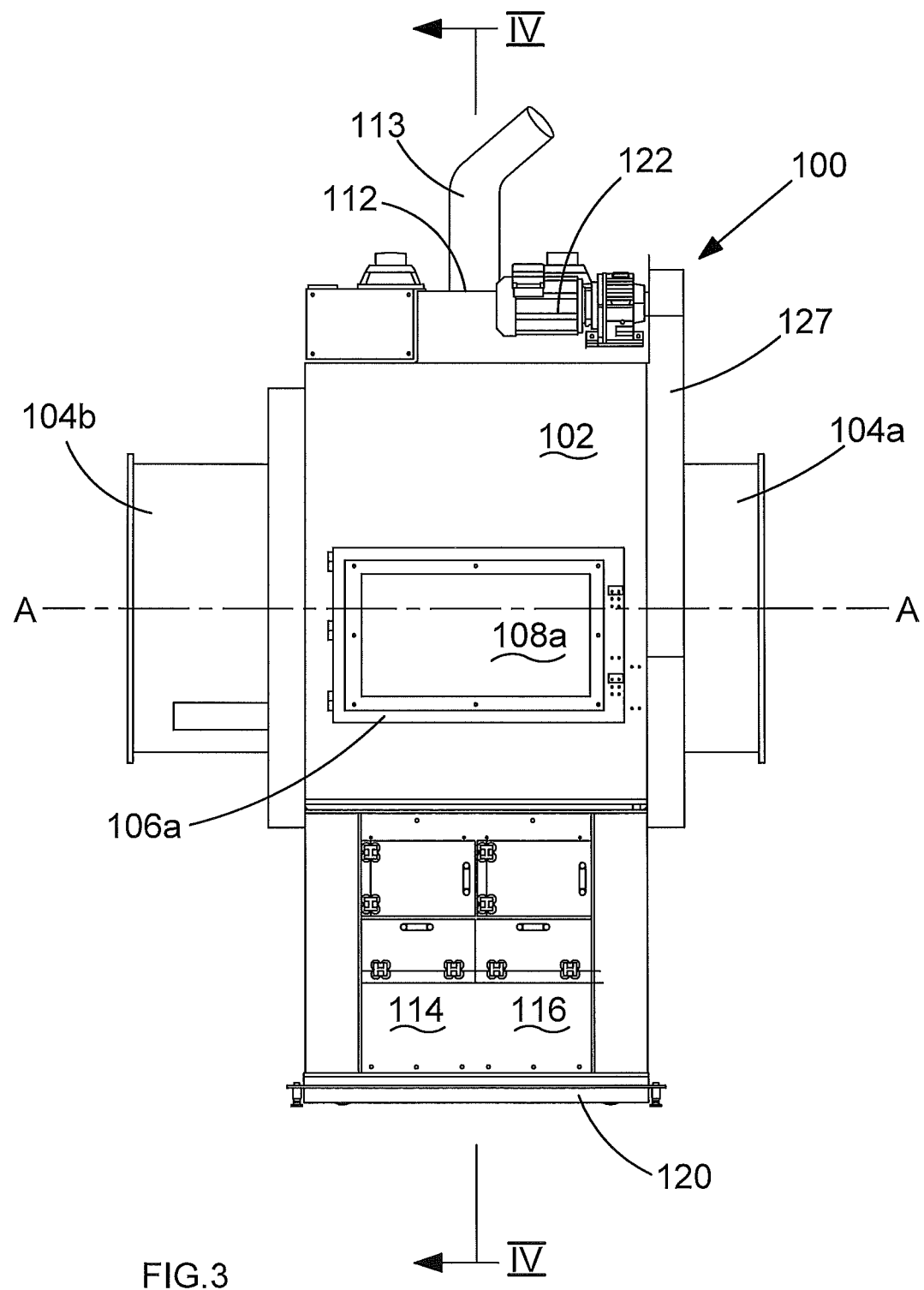
FIG. 3 shows a side elevation view of the coating machine of FIG. 2.

Referring to FIGS. 2 and 3, there is shown an applicator machine 100 for the oil and gas pipeline industry according to the present invention. The applicator machine 100 comprises a generally cubic-shaped or cuboid-shaped enclosure 102. The enclosure 102 has in internal cavity through which may pass a pipeline. The enclosure 102 has a pair of mutually aligned circular pipeline holes 104a, 104b, one through each opposite end of the body and coaxial with a longitudinal axis A-A through the centre of the applicator machine 100. The pipeline holes 104a, 104b are large enough to accommodate the passage of pipelines having various diameters of anywhere between 0.05 meters to 1.5 meters.

The enclosure 100 has a lockable hinged door 106a, 106b on each opposite side to provide an operator with access to inside the enclosure 102. Each door 106a, 106b has a respective window 108a, 108b providing an operator with visibility of inside the enclosure 102.

The bottom of the enclosure 102 is shaped as a hopper 110 to collect any stray powder coating material heavy enough to fall towards the hopper 110, under gravity, and direct it towards a heavy powder extraction tube 111 at a lowest point of the hopper 110. CMPP powder is relatively heavy and more likely to drop to into the hopper 110 than FBE powder.

The top of the enclosure 102 is has a light powder extraction port 112 to suck out any stray powder coating material light enough to remain airborne and direct it towards a light powder extraction tube 113. FBE powder is relatively light and more likely to remain airborne than CMPP powder.

The heavy and light powder extraction tubes 111, 113 are connected, via an air filter (not shown), to a vacuum pump (not shown) which draws powder-entrained air from the enclosure 102. The purpose of the heavy and light powder extraction tubes 111, 113 is to evacuate powdered coating material that has not adhered to the surface of the field joint 44, 46, 48 from the enclosure 102 and pass it through the air filter, where it is separated from the air flow, and collect it in a bin (not shown) to be discarded later. Cleaned air flows downstream from the filter to the vacuum pump where it is exhausted to atmosphere. The air filter, collection bin and vacuum pump are standard parts well known in this field of technology.

The applicator machine 100 comprises a CMPP fluid bed 114 for storing chemically modified polypropylene in powder form and a FBE fluid bed 116 for storing fusion bonded epoxy in powder form. The CMPP fluid bed and the FBE fluid bed are slidably accommodated in the applicator machine, adjacent to each other and under the hopper 110, to facilitate refilling as and when necessary.

At the bottom of each fluid bed 114, 116 is an air porous membrane (not shown) upon which sits FBE or CMPP powder material. An air pump (not shown) selectively pumps air though the membrane of one or both of the fluid beds 114, 116 thereby fluidizing the FBE or CMPP power material contained therein. FBE or CMPP powder-entrained air flows from the selected fluid bed(s) 114, 116 and passes through a venturi arrangement (not shown), which regulates the mix of powder and air in the powder-entrained air flow. The powder-entrained air flows to a main feed pipe 150 to a pair of powder applicators 146, 148. The powder applicators are discussed in more detail below. The air porous membranes, air pump and venturi arrangement are standard parts well known in this field of technology.

The applicator machine 100 comprises a human/machine interface 118 to enable control of the applicator machine by an operator. The interface 118 presents an operator with a menu to start or stop the applicator machine 100 and/or select a coating process. Other aspects of the coating process may be controlled automatically by the interface 118 once the operator has started the applicator machine 100.

The enclosure 102 is supported on the ground by a base plate 120. The applicator machine 100 comprises an electric motor 122 fixed to the enclosure 102. The electrical power supply to the motor 122 is controlled by the interface 118.

Powdered FBE is widely used in the pipeline industry to protect steel. It is an anti-corrosion layer which is normally applied on bare metal with a thickness of 200-500 microns to act as a primer layer or it can be applied as the single layer coating with a thickness of a few millimeters.

Powdered CMPP is commonly used to the pipeline industry. It is an adhesive layer which is may be applied on the FBE primer layer with a thickness of 400-800 microns. Optionally, CMPP powder may be mixed with FBE powder and sprayed upon a purely FBE primer layer (before a purely CMPP layer is applied) in an interlock layer having a thickness of no more than a couple of passes of the coating applicator. This interlock layer is to improve bonding between the purely FBE primer layer and the purely CMPP layer.

Figure 4:
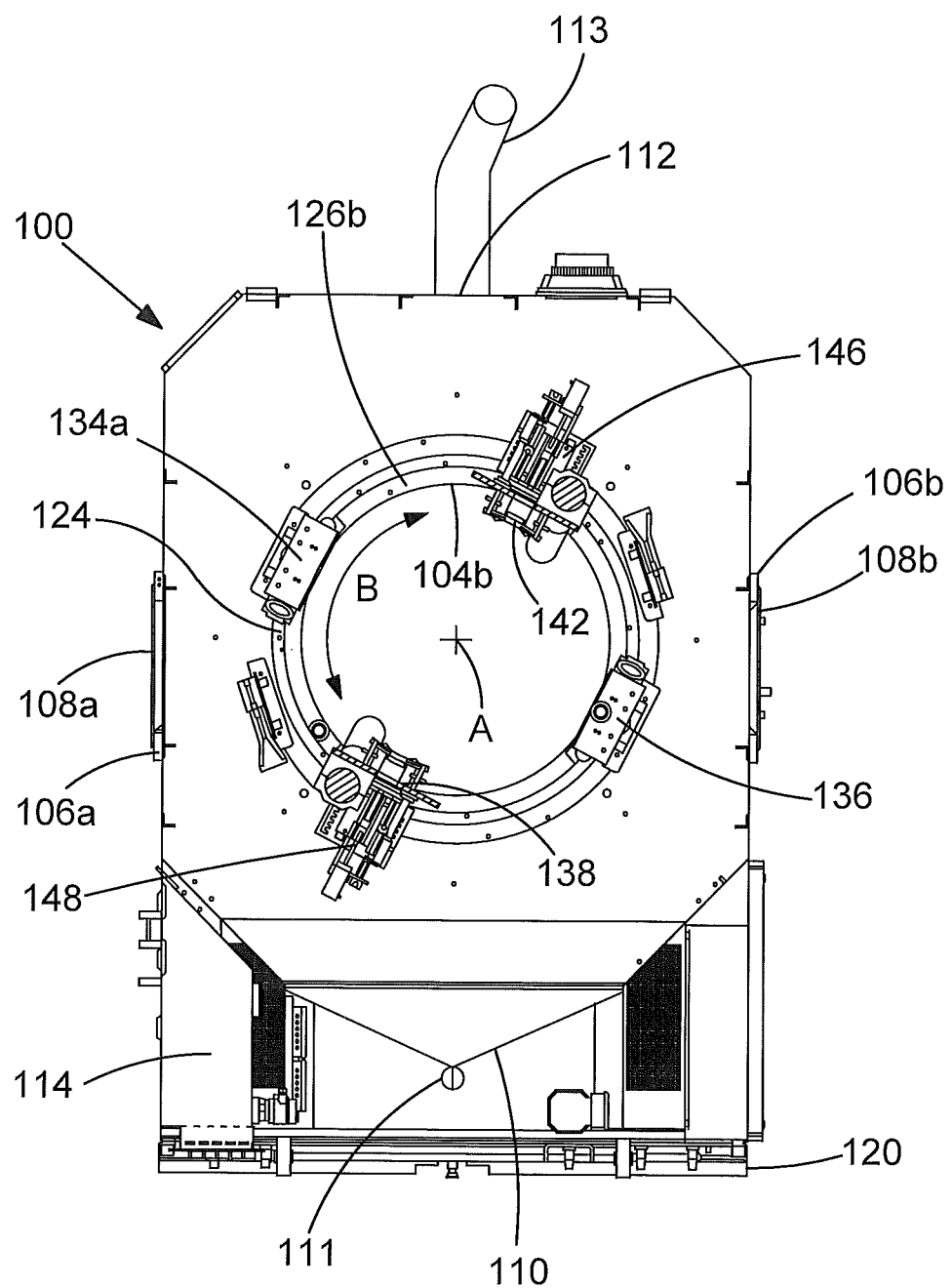
FIG. 4 shows a cross-section IV-IV of the coating machine as it is shown in FIG. 3.
Figure 5:
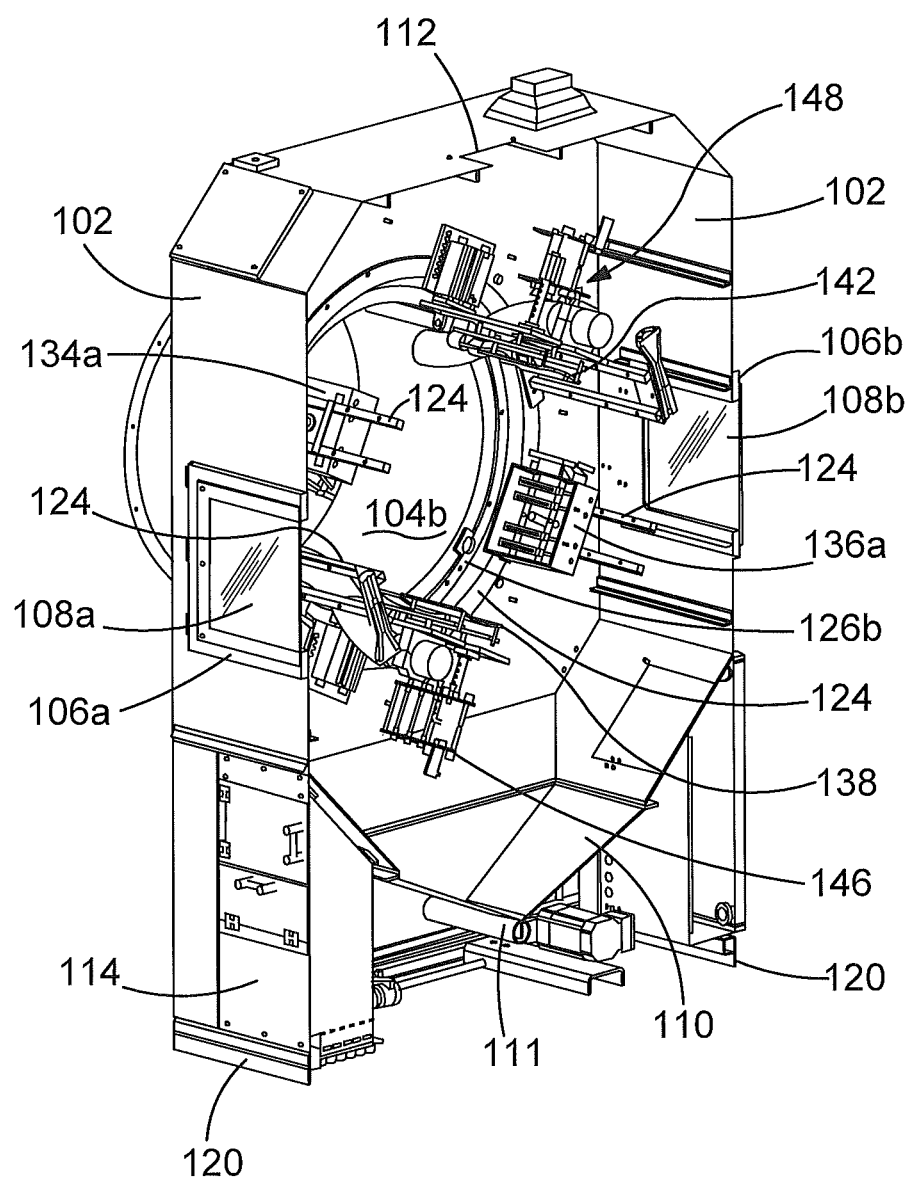
FIG. 5 shows a perspective view of the cross-section of FIG. 4.
Figure 6:
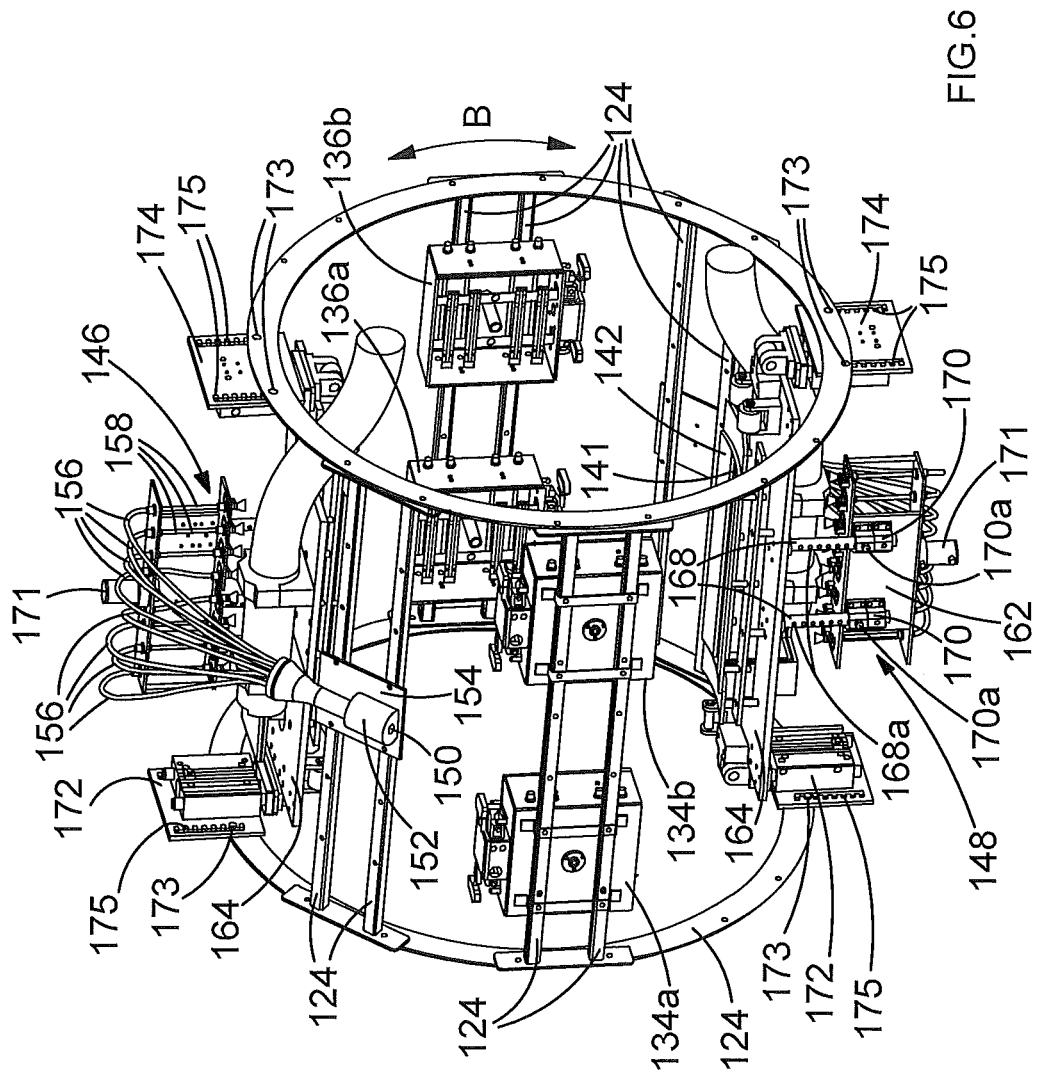
FIG. 6 shows a perspective view of cylindrical frame of the coating machine.
Figure 7:
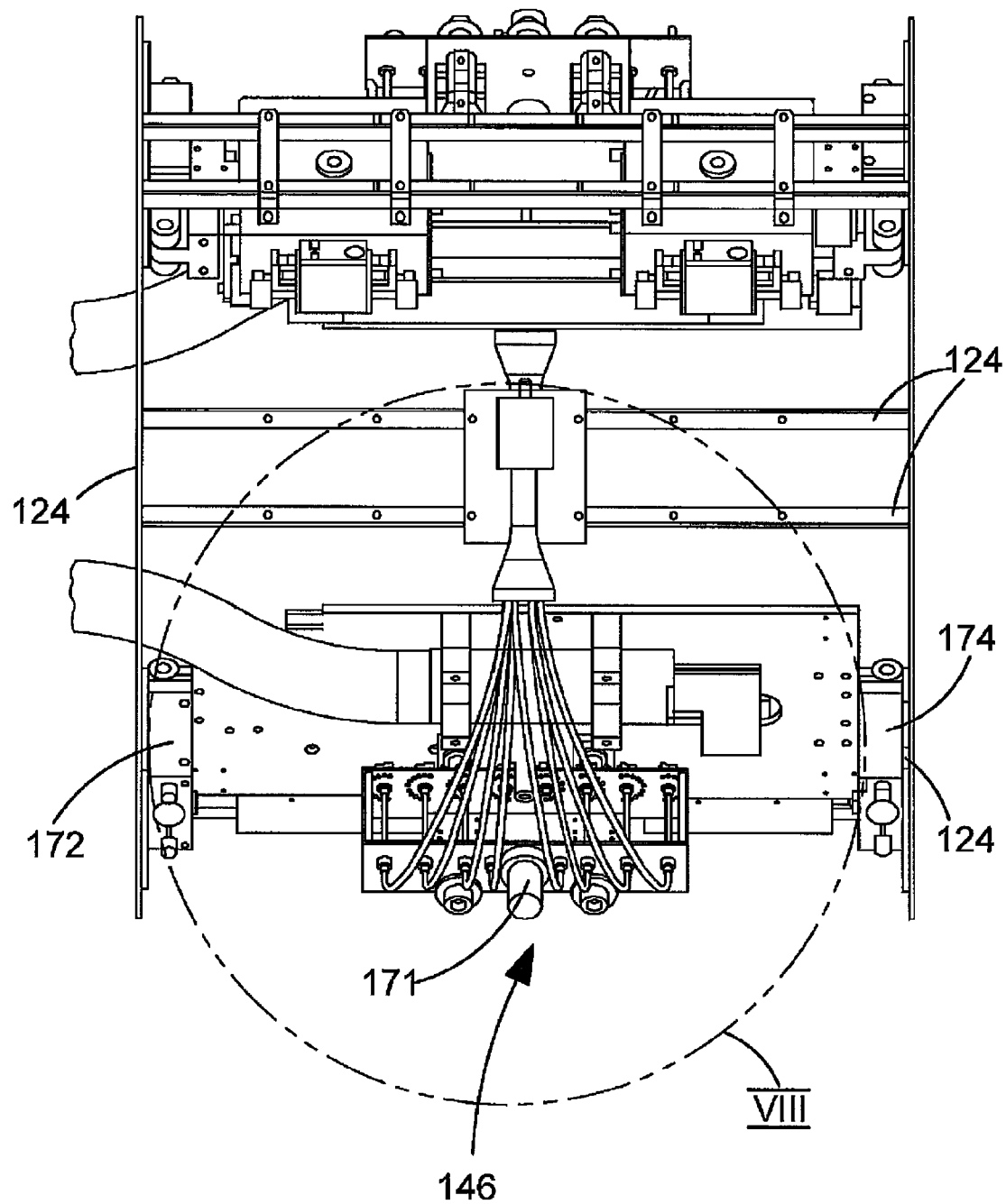
FIG. 7 shows a top view of the cylindrical frame of FIG. 6.
Figure 8:
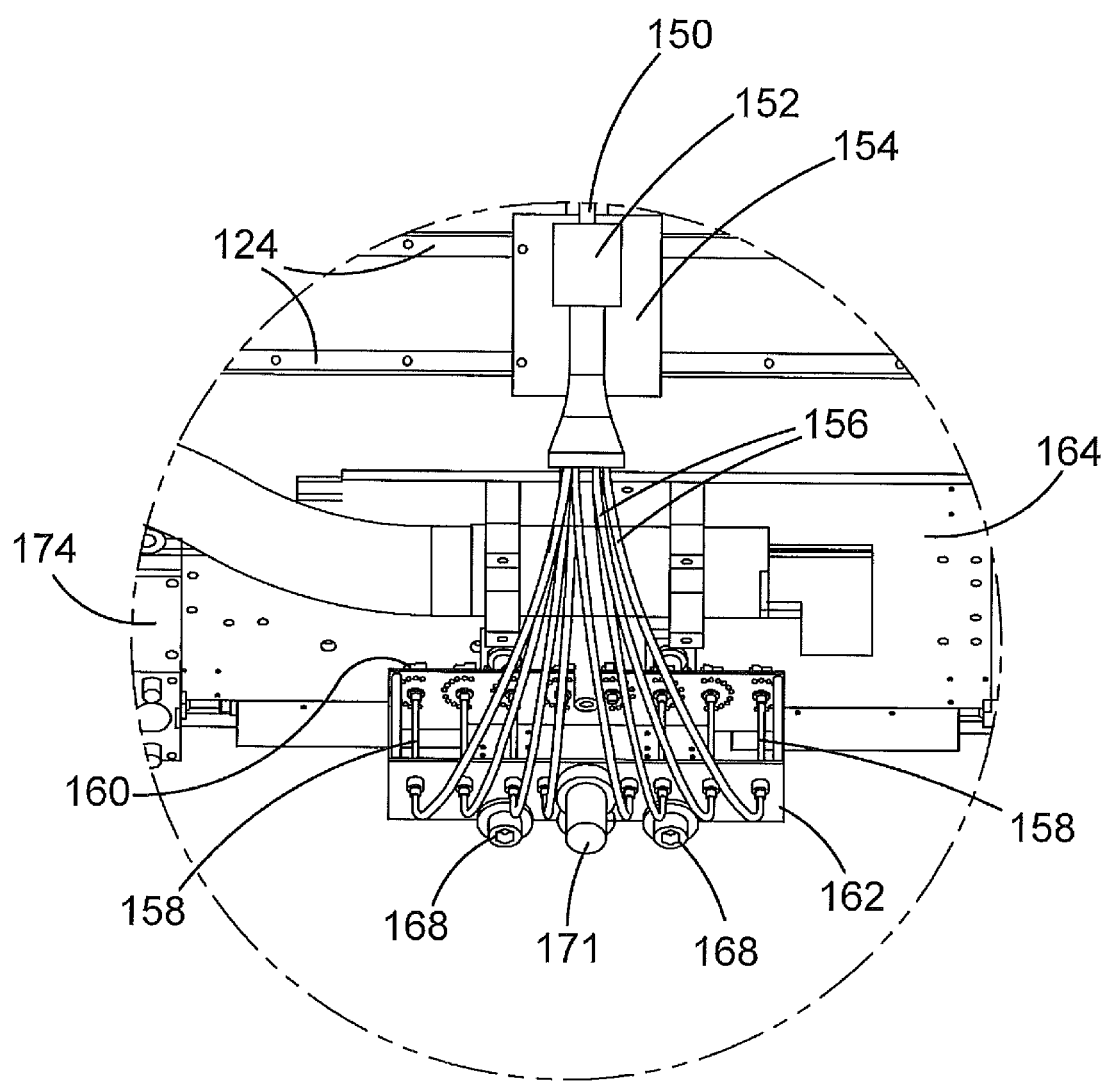
FIG. 8 shows a detail VIII of a powder applicator on the cylindrical frame as it is shown in FIG. 7.

Referring to FIGS. 4 to 6, the applicator machine 100 comprises a frame 124 circumscribing a generally cylindrical shape coaxial with the axis A-A of the pipeline holes 104a, 104b and a pipeline in the enclosure 102. The frame is made of aluminium, stainless steel or another substantially non-magnetic rigid material. The frame 124 is supported for rotation about the axis A-A by a pair of bearings 126a, 126b, one at each opposite axial end of the body 112 adjacent a respective pipeline hole 104a, 104b. The motor 122 is coupled to the frame 124 via a transmission (not shown) protected by a shroud 127. The transmission may be any mechanism capable of transmitting the motor's rotational output to rotation of the frame, like, for example, an endless chain or belt or a drive shaft. The frame 124 is rotatable by the motor 122 in both directions of double-headed arrow B through and arc of 180 degrees (+/−5 degrees to allow for coating overlap). Electrical power supply and operation of the motor 122 is controlled by the interface 118.

The applicator machine 100 comprises two pairs of radiant heater cassettes 134a, 134a and 136b, 136b, each pair of radiant heater cassettes being fixed to diametrically opposite sides of the frame 124. The radiant heater cassettes 134a, 134a, 136b, 136b of each pair are axially spaced from each other so that they may heat the chamfered portions 58, 60 of the factory-applied coatings 50, 52 of pipe sections 40, 42 in the enclosure 102. One of each pair of radiant heater cassettes 134a, 136a heats one chamfered portion 58 while the other of each pair of radiant heaters cassettes 134b, 136b heats the other chamfered portion 60. Electrical power supply and operation of the radiant heater cassettes 134a, 134b, 136a, 136b is controlled by the interface 118.

The frame 124 comprises a pair of induction heater plates 138, 142, one at each diametrically opposite side of the frame 124 approximately equidistant between the two pairs of radiant heater cassettes 134a, 134a and 136b, 136b. Each induction heater plate 138, 142 has a partially cylindrical underside 138a, 142a facing a field joint 44, 46, 48 in the enclosure 102. The cylindrical undersides 138a, 142a are longitudinally-orientated parallel to the axis A-A and match, as far as possible, the cylindrical outer shape of a field joint 44, 46, 48. This helps the induction heater plates 138, 142 to direct and concentrate the induction heating effect towards the field joint 44, 46, 48 section of a pipeline to be heated and coated.

Figure 15:
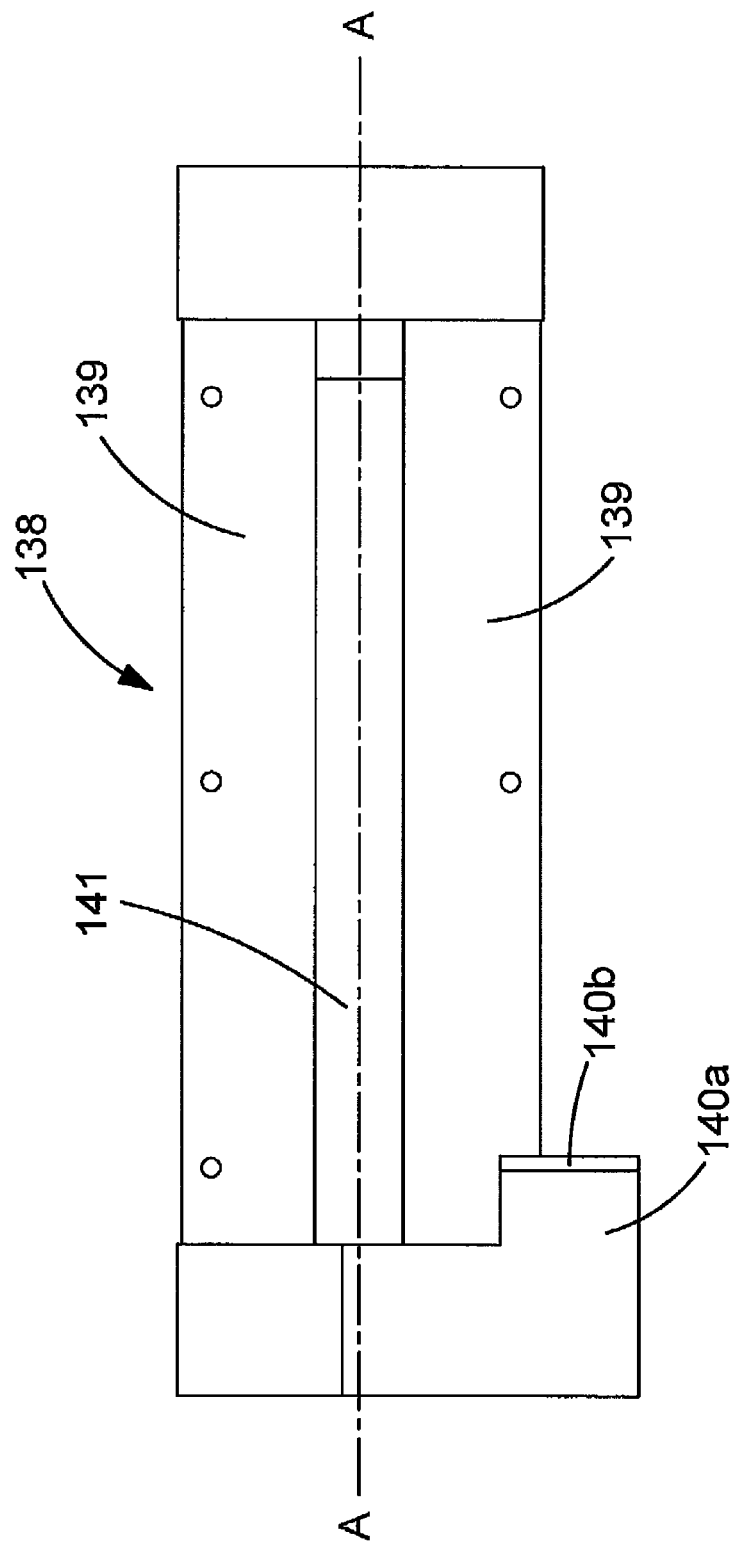
FIG. 15 shows a top view of an induction heater plate.

Referring to FIG. 15, there is shown the induction heater plate 138 in more detail, it being understood that the other induction heater plate 142 has the same basic construction. The induction heater plate 138 has a generally rectangular outer profile 139, when viewed from above. The induction heater plate 138 is electrically coupled to a pair of electrical terminals 140a, 140b located at one end of the induction heater plate 138. The outer profile 139 surrounds a rectangular central aperture 141. The long sides of the outer profile 139 and the central aperture 141 are arranged parallel to the axis A-A. One short side of the outer profile 139 is electrically split so that the induction heater plate is effectively a single coil wherein one end of the coil is electrically coupled to one terminal 140a and the other end of the coil is electrically coupled to the other terminal 140b. The terminals 140a, 140b of each induction heater plate 138, 142 are connected to an alternating electrical power supply (not shown) having, and purely for the purpose of example, an output variable up to 110 kW and a frequency of between 10 and 25 kHz to produce an induction heating effect in the induction heater plates 138, 142. Alternating electrical power supplies for induction heaters are standard parts well known in this field of technology. Operation of the alternating electrical power supply to the induction heater plates 138, 142 is controlled by the interface 118.

It is important that the induction heater plates 138, 142 are electrically insulated from the structures they are mounted upon. The induction heater plates 138, 142 are coated or wrapped with an insulating material.

Returning to FIGS. 4 to 6, the induction heater plates 138, 142 are sized and positioned so that they may heat the field joint 44, 46, 48 section of pipeline (i.e. having an axial length of approximately 300 mm in the example shown, although it can be a length of 725 mm or more) up to, but not including, the chamfered portions 58, 60 of the factory-applied coatings 50, 52.

The frame 124 comprises a pair of powder applicators 146, 148 one at each diametrically opposite side of the frame 124. Each powder applicator 146, 148 is arranged to apply a coating of FBE and/or CMPP powder around the field joint 44, 46, 48. Operation of the powder applicators 146, 148, is controlled by the interface 124.

Referring to FIGS. 6 to 14, there is shown the powder applicator 146 and the induction heater plate 138 in more detail, it being understood that the other powder applicator 148 and the other induction heater plate 142 has the same basic construction. The powder applicator 146 comprises a main feed pipe 150 fluidly connected to powder-entrained air flow from the CMPP powder bed 114 and the FBE powder bed 116 to the inlet of a feed pipe splitter 152. The feed pipe splitter 152 is supported on a plate 154 fixed to the frame 124. The power applicator 146 comprises eight split feed pipes 156 each fluidly connected from a respective outlet of the feed pipe splitter 152 to the inlet of a respective straight nozzle feed 158.

The outlet of each of the array of eight nozzle feeds 158 comprises a rotatable nozzle 160. In the example shown, there are eight sets of feed pipes 156, nozzle feeds 158 and nozzles 160 although there may be more, or fewer, depending on the type and dimensions of the section of pipeline for which the applicator machine 100 is designed to coat. Each nozzle feed 158 has a flow regulator to provide additional precision and control over the flow rate of coating material sprayed from the nozzles 160. Also, the flow regulators at the ends of the eight nozzle feed array may be closed to alter the length of section of pipeline coated by the applicator machine 100. The nozzle feeds 158 and the nozzles 160 are supported by a bracket assembly 162 coupled a board 164 via a bracket coupling mechanism 166.

The bracket coupling mechanism 166 comprises a pair of pillars 168 fixed to the top side of the board 164 and a pair of collars 170 fixed to the bracket assembly 162. Along the length of each respective pillar 168 is a line of equallyspaced notches 168a. Each collar 170 surrounds a respective pillar 168. Each collar 170 has a retractable pin 170a normally biased towards the notches 168a of its pillar 168. An operator may, prior to use of the applicator machine 100, pull both pins 170a away from the pillars 168 to disengage the pins 170a from the notches 168a and to enable sliding movement of the bracket assembly 162 towards or away from the board 164. When the operator ceases pulling, the pins 170a return towards their respective pillars 168 to engage whichever notches 168a are selected by the operator for the appropriate distance between the bracket assembly 162 and the board 164. The bracket assembly 162 and the bracket coupling mechanisms 166 maintain the array of eight nozzles 160 in a straight line parallel to the axis A-A at a fixed location along the length of the axis A-A.

Each bracket assembly 162 comprises a respective pyrometer 171 for measuring the surface temperature of the field joint 44, 46, 48 section of pipeline in its vicinity. These temperatures are communicated to the interface 118 in real time. The interface 118 displays these temperatures to the operator.

The board 164 is coupled to the frame 124 via a pair of board coupling mechanisms 172, 174, one such board coupling mechanism being located at each axial end of the board 164. The board coupling mechanisms 172, 174 bias the board 164 a short radial distance towards the axis A-A. The board coupling mechanisms 172, 174 act independently of each other to maintain the board 164 parallel to outer cylindrical shape of the field joint 44, 46, 48 in the enclosure 102 which, in normal circumstances, is also parallel to the axis A-A. The board coupling mechanisms 172, 174 maintain the angle of incidence of the nozzles 160 with respect to the field joint 44, 46, 48 as close as possible to zero degrees (i.e. a radial approach).

The board coupling mechanisms 172, 174 are connected to opposite axial ends of the frame 124 by fasteners 173. Each fastener 173 engages a respective parallel row of notches 175, two of which are in each board coupling mechanisms 172, 174. Different notches 175 correspond to different distances of the board coupling mechanisms 172, 174 and the board 164 from the axis A-A. Unfastening the fasteners 173 permits selection of different notches 175. This, in turn, permits adjustment of the distance between the board 164 and the axis A-A to accommodate pipelines with different diameters.

The induction heater plate 138 is mechanically fixed to the bottom of the board 164 (on the opposite side to the bracket assembly 162). As mentioned above, the induction heater plate 138 is electrically insulated from the board 164. The underside 138a of the induction heater plate 138 faces the field joint 44, 46, 48 in the enclosure 102. Also fixed to the bottom of the board 164 is a pair of rollers 176, 178, one at each opposite axial end of the board 164. The rollers 176, 178 are rotatable about an axis parallel to the axis A-A. Each roller 176, 178 is biased by a respective board coupling mechanism 172, 174 against a respective factory-applied coating 50, 52 of pipe sections 40, 42 in the enclosure 102. The rollers 176, 178 follow the shape of the pipe sections 40, 42 and, in combination with the board coupling mechanisms 172, 174, move the board 164 in a way that compensates for different diameters of pipe sections 40, 42 and/or deviations from a purely cylindrical outer shape. This tolerance ensures that the induction heater plate 138 is maintained at about the right height (approximately 10 mm to 20 mm) above the field joint 44, 46, 48 for optimum induction heating and/or to avoid the welded joint 44 which can stand 5 mm proud of that section of pipeline.

Straight nozzle feeds 158 deliver a more laminar fluid flow to the nozzles 160 than would be delivered by curved nozzle feeds. As mentioned above, powder-entrained air flow through the nozzles 160 is regulated by the venturi arrangement upstream of the main feed pipe 150 for optimized powder coating thickness.

Figure 10:
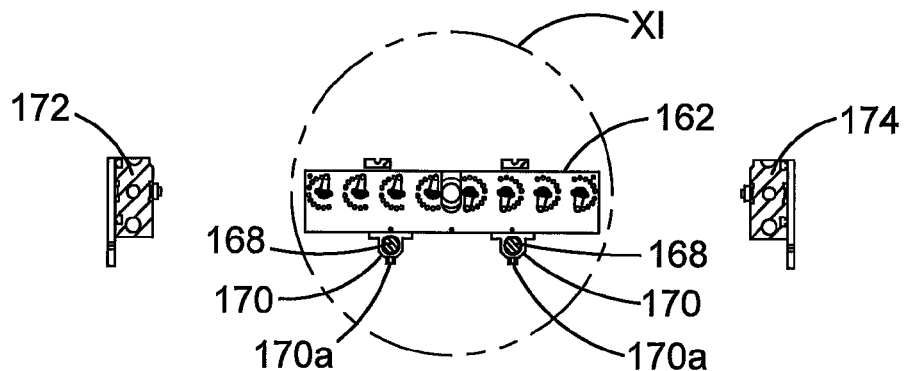
FIG. 10 shows a cross-section X-X of the powder applicator as it is shown in FIG. 9.
Figure 9:
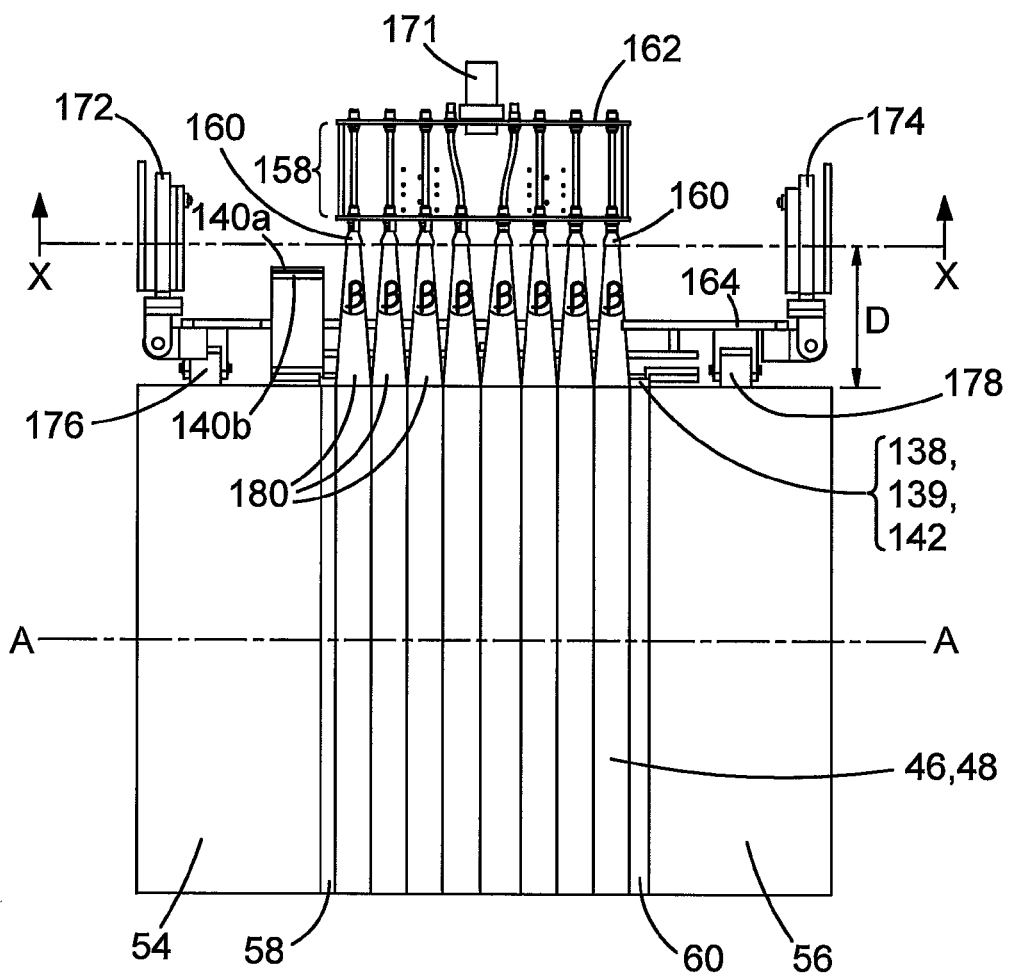
FIG. 9 shows a top view of the powder applicator in use on a field joint section of pipeline.
Figure 11:
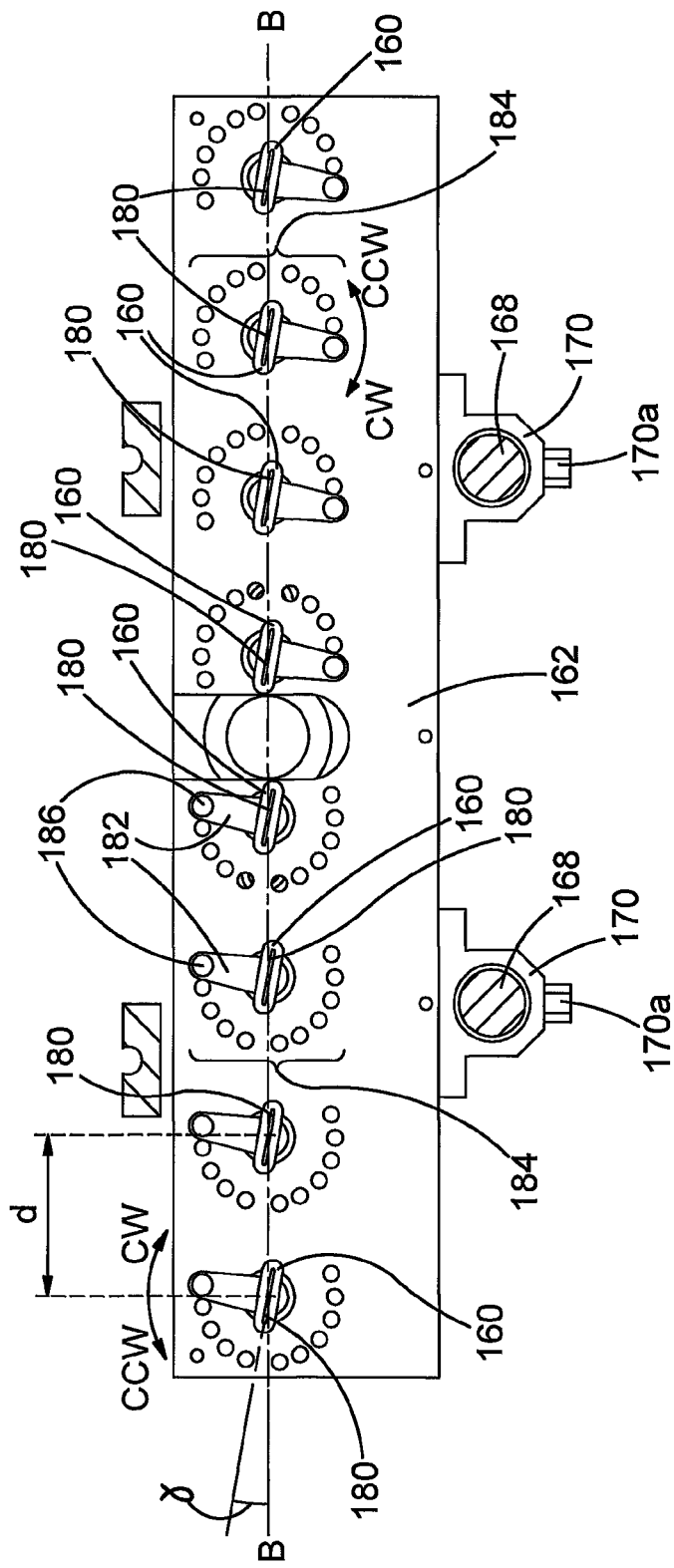
FIG. 11 shows a detail XI of the powder applicator as its is shown in FIG. 9.
Figure 12:
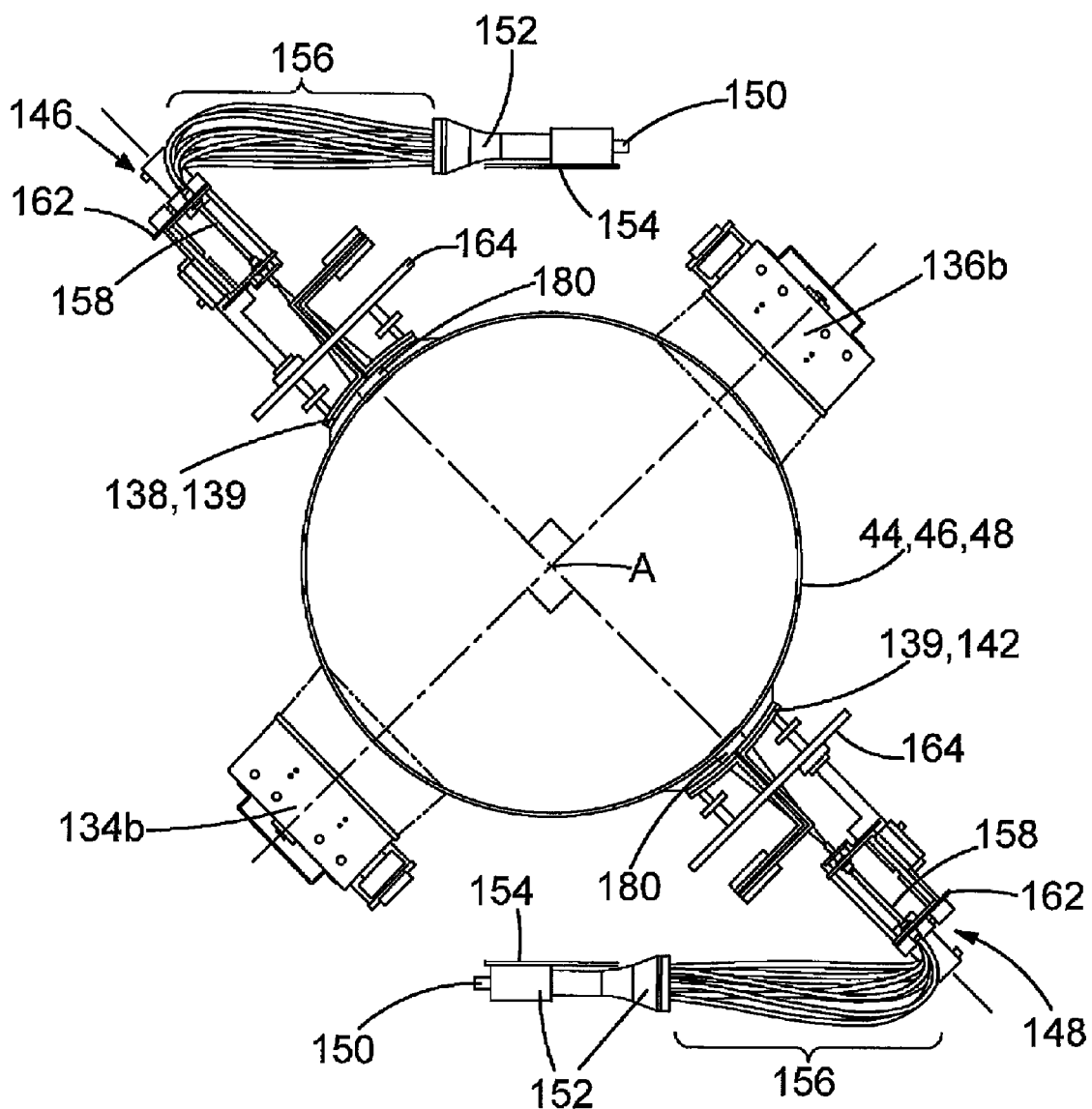
FIG. 12 shows a side elevation view of components of the powder applicator in use on a field joint section of pipeline.
Figure 13:
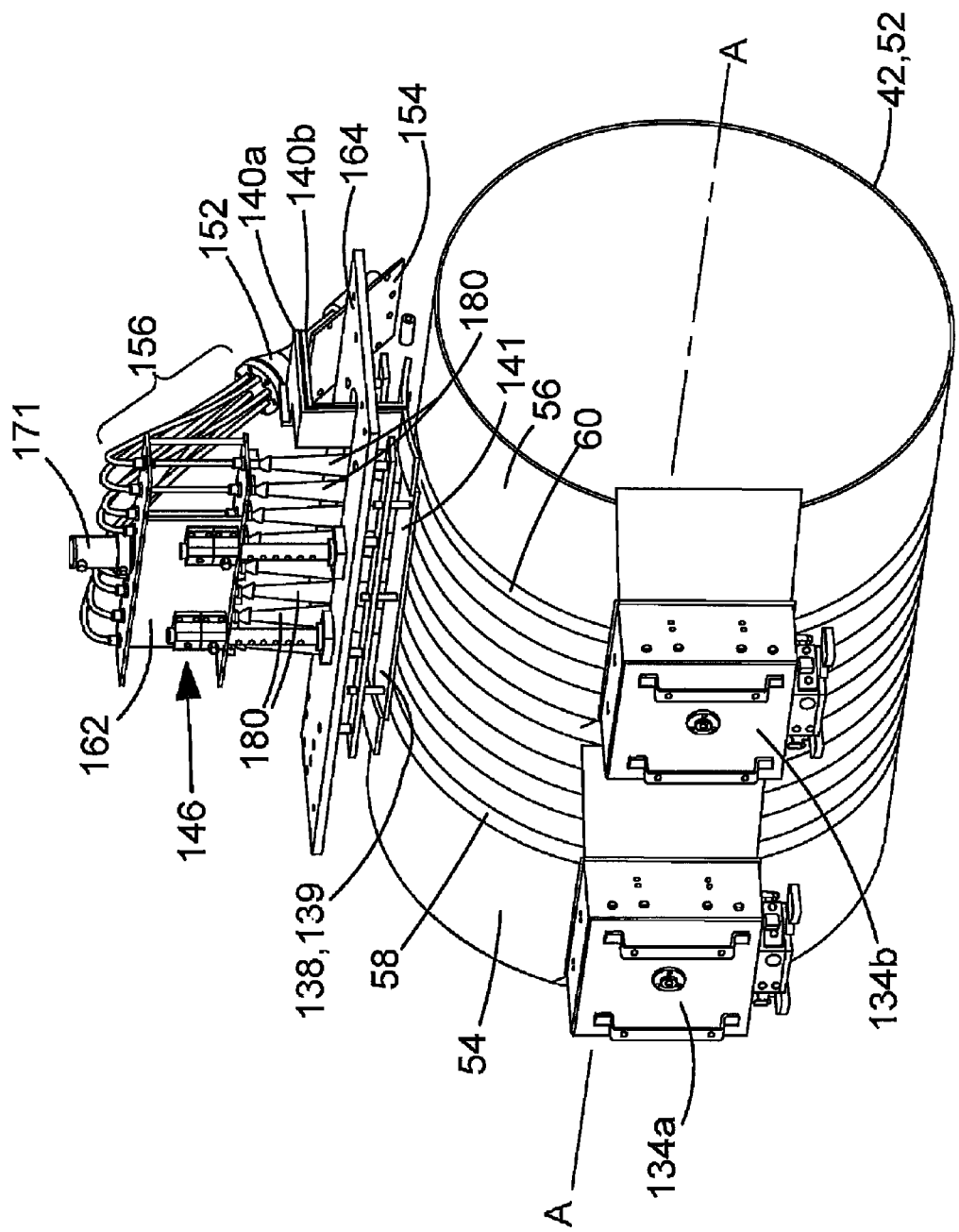
FIG. 13 shows a perspective view of components of FIG. 12 from one end.

Referring in particular to FIGS. 10 to 12, each nozzle 160 comprises a flat slit which emits a spray plane 180 of powder-entrained air fanning out from the nozzle. The spray planes 180 have a generally fan-shaped profile when viewed from above, as is shown in particular by FIG. 9. The distance d between adjacent nozzles 152 and an angle β subtended by the fan-shaped profile of the spray planes 180 are fixed. Distance D between the nozzles 152 and the ends 46, 48 of pipe sections 40, 42 in the enclosure 102 is variable by adjustment of the bracket coupling mechanism 166 and/or the fasteners 173 in the board coupling mechanism 172, 174.

Each nozzle 160 is adjustable to rotate in a clockwise CW, or a counter-clockwise CCW, direction about a central longitudinal axis of its respective straight nozzle feed 158, as is shown in particular by FIG. 11. When viewing the nozzles end-on, the cross-sections of the spray planes 180 are arranged as an array of eight parallel lines each inclined by a spray plane angle γ with respect to a central plane B-B through the bracket assembly 162. The central plane B-B is substantially parallel to the axis A-A. The spray plane angle γ is adjustable, by rotation of the nozzles 160 between +90 degrees and −90 degrees, in the manner of a Venetian blind.

Each nozzle 160 has a respective collar with a tab 182 extending radially away from the nozzle 160. Around each nozzle 160 is a respective arc of recesses 184 in the bracket assembly 162. Each tab 182 has a detent 186. Inherent elasticity in the material of the tab 182 biases the detents 186 into engagement with a recess 184. Each recess 184 corresponds to a different spray plane angle γ for its adjacent nozzle 152. An operator can rotate the detents 186 between recesses 184 to incrementally adjust the spray plane angle γ of the nozzles 160.

Adjustment of the distance D varies the point at which the spray planes 180 meet the ends 46, 48 of pipe sections 40, 42 in the enclosure 102. Adjustment of the flow regulators of the nozzles feeds 158 varies the flow rate of coating material sprayed from the nozzles 160. Adjustment of the spray plane angle γ varies the concentration and distribution of powder spray along the field joint 44 46, 48 at that meeting point. The greater the spray plane angle γ (up to +/−90 degrees) the further that edges of adjacent spray planes 180 are from each other. Conversely, the smaller the spray plane angle γ (down to zero degrees) the closer that edges of adjacent spray planes 180 are to each other. It would be undesirable for adjacent spray planes 180 to overlap in a way that causes uncontrolled turbulence or clusters of powder concentrations along the array of nozzles 160. This could cause undesirable coating high/low points on the field joint 44, 46, 48. Thus, before operation of the applicator machine 100, the operator configures the powder applicators 146, 148, by alteration of one or more of the distance D, the position of the flow regulators, and the spray plane angle γ, so that the nozzles 160 spray, as near as possible, an uninterrupted smooth layer of powder over the field joint 44, 46, 48 section of pipeline.

Figure 14:
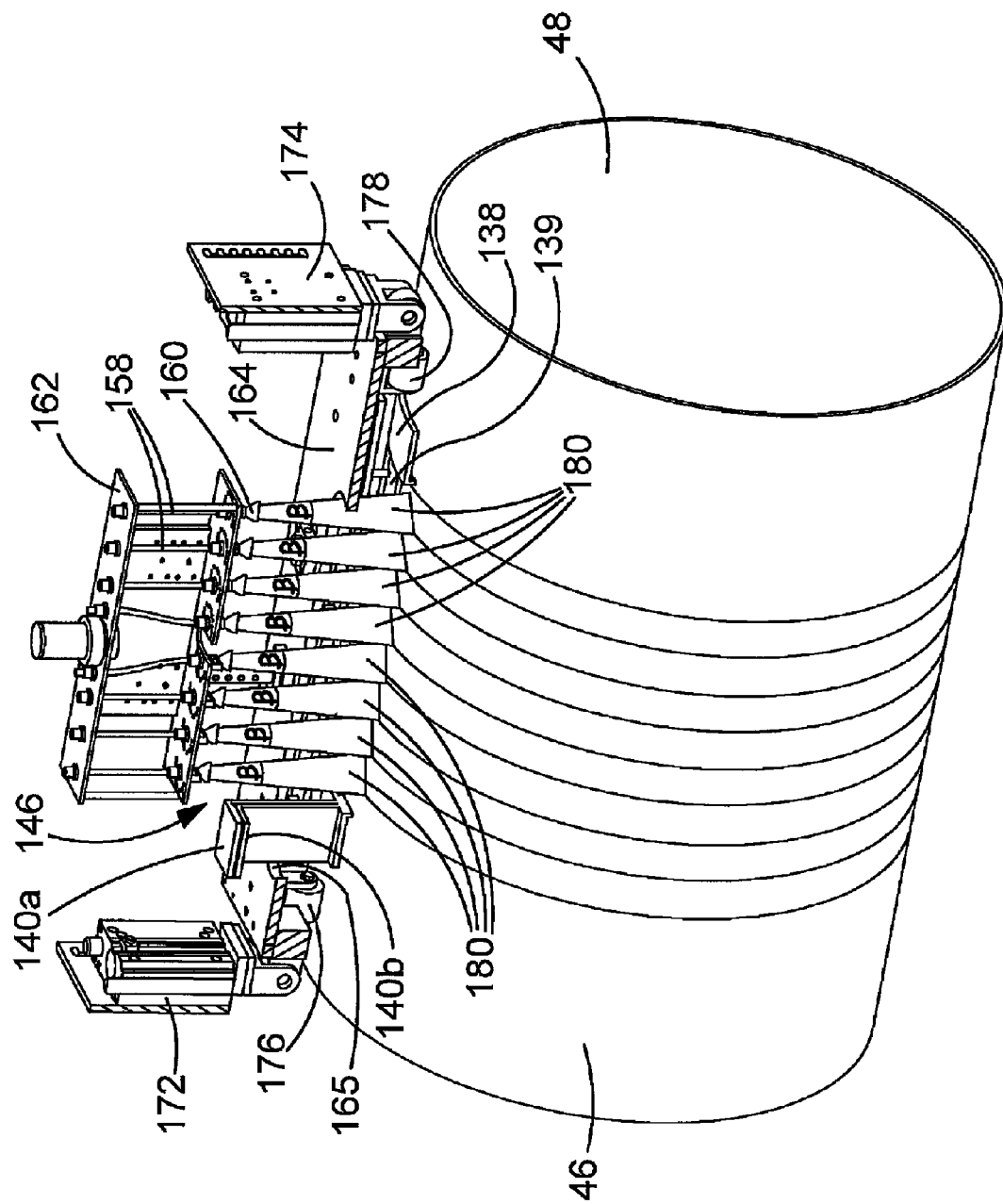
FIG. 14 shows a perspective view of components of FIG. 12 from one side in partial cross-section.

Referring in particular to FIG. 14, each board 164 has an elongate central aperture 165 approximately the same size as, and located directly above, the central aperture 141 through the adjacent induction heater plate 138, 142. The array of eight spray planes 180 of the powder applicator 146 is directed to pass through the central aperture 165 of the board 164 and the central aperture 141 of the induction heater plate 138 to the field joint 44, 46, 48. Although not shown in FIG. 14, it is clear from the other figures that the array of eight spray planes 180 of the powder applicator 148 is likewise directed to pass through the central aperture 165 of its board 164 and the central aperture 141 of the induction heater plate 142 to the field joint 44, 46, 48. As mentioned above, the spray planes 180 make a directly radial approach to the field joint 44, 46, 48. Each powder applicator 146, 148 and induction heater plate 138, 142 combination is arranged (in a radial plane containing the axis A-A) directly above a field joint 44, 46, 48 section of pipeline. The spray planes 180 engage the pipe sections 40, 42 under the induction heater plates 138, 142 precisely in the zone of where induction heating of the pipe sections is optimized. This avoids any heat decay between heating the skin of the steel pipe section 40, 42 and applying the powder coating.

Operation of the applicator machine 100 shall now be described, with reference to FIGS. 1 to 14.

The welded joint 44 of two factory-coated pipe sections 42, 44 is fed through the pipeline holes 104a, 104b of the applicator machine 100 to the middle of the frame 124. This can be visually checked by an operator looking though the windows 108a, 108b. The weight of the pipe sections 42, 44 is supported on each side of the enclosure 102 by external supports (not shown). The enclosure 102 surrounds the field joint 44, 46, 48 section of pipeline without performing a support function.

The operator selects a heating and coating process from the menu presented by the human/machine interface 118 and starts the applicator machine 100.

The rollers 176, 178 contact the factory-applied coatings 50, 52 of pipe sections 40, 42. The diametrically opposed induction heater plates 138, 142 are activated before any spray coating starts. Heating is automatically tuned by the alternating electrical power supply according to the distance between the induction heater plates 138, 142 and the bare steel field joint 44, 46, 48. The induction heater plates 138, 142 are configured to heat the field joint 44, 46, 48 section of pipeline between the chamfered portions 58, 60 of the factory-applied coatings 50, 52. The induction heater plates 138, 142 need only heat the surface of the field joint 44, 46, 48 to a depth of about 0.3 mm to the pre-set minimum FBE powder application temperature of 233 degrees Celsius +/−15 degrees Celsius.

The pyrometers 171 are activated to monitor the surface temperature of the field joint 44, 46, 48 section of pipeline.

The electric motor 122 is activated to rotate the cylindrical frame 124, and all components mounted thereto, about the axis A-A in oscillating sweeps of 180 degrees (or slightly more to avoid gaps in the arcs of coating material) in both directions of double-headed arrow B. The induction heater plates 138, 142 begin to heat the field joint 44, 46, 48.

Once the surface temperature of the field joint 44, 46, 48 has reached the minimum FBE powder application temperature then the alternating electrical power supply changes to a lower power output to maintain the field joint 44, 46, 48 'simmering' at the minimum FBE powder application temperature. The simmering is controlled by the interface 118. Heating the field joint 44, 46, 48 helps the CMPP powder and/or FBE powder to adhere to the surface.

If FBE powder coating is required then FBE powder-entrained air flows from the FBE Fluid bed 116 to the powder applicators 146, 148 which spray the heated field joint 44, 46, 48 with multiple passes of FBE powder in a pre-defined application sequence.

Once the FBE powder coating has been applied, if a CMPP powder coating is required air flow is switched from the FBE fluid bed 116 to the CMPP fluid bed 114. CMPP powder-entrained air flows from the CMPP fluid bed 114 to the powder applicators 146, 148 which spray the heated field joint 44, 46, 48 with multiple passes of CMPP powder in a pre-defined application sequence.

As an optional additional step, a thin combined FBE powder and CMPP powder interlock layer may also be applied with a pre-defined application sequence where required. This consists of no more than a couple of passes of combined FBE powder and CMPP powder. To do this, air flow passes through both the FBE fluid bed 116 and the CMPP fluid bed 114 at the same time.

Any stray FBE and/or CMPP powder particles, which have not adhered to the heated field joint 44, 46, 48 during the coating process, are continually extracted from the enclosure 102 by suction through the extraction tubes 111, 113.

The two pairs of diametrically opposed radiant heaters 134a, 134b and 136a, 136b may be activated, if necessary, before spray coating ends. The radiant heaters 134a, 136a are configured to heat one chamfered portion 58 of the factory-applied coating 50 and the radiant heaters 134b, 136b are configured to heat the chamfered portion 60 of the other factory-applied coating 52. The purpose of this is to prepare the chamfered portions 58, 60 for bonding with a second layer of material to completely coat the field joint 44, 46, 48.

When the primer layer coating process is complete the radiant heaters 134a, 134b and 136a, 136b and the induction heater plates 138, 142 may remain active to keep the field joint 44, 46, 48 with newly-coated primer layer and the factory-applied coatings 50, 52 warm in preparation for the next stage in the construction process where a second layer of polypropylene, polyethylene, and polyurethane material may be applied over the primer layer to complete the field joint section of pipeline.

When the pipeline is ready, the field joint 44, 46, 48 with newly-coated primer layer is fed out of the applicator machine 100 which is ready to receive the next section of pipeline to be coated with a primer layer. During this feeding process, the radiant heaters 134a, 134b and 136a, 136b and the induction heater plates 138, 142 are deactivated.

Advantageously, there is no manual handling of the pipe sections 42, 44 between the operations of (i) heating with the induction heater plates 138, 142; (ii) coating with the powder applicators 146, 148; and (iii) heating with the radiant heater cassettes 134a, 134b and 136a, 136b. Thus, the cycle time for operation of the applicator machine 100 is diminished.

Previous applicator machines tended to overheat the section of pipeline to compensate for heat decay in the time between induction heating and powder spray coating. Advantageously, the applicator machine 100 only heats the field joint 44, 46, 48 section of pipeline to the minimum powder application temperature because the powder coating process occurs simultaneously. This avoids overheating the adjacent factory-applied coatings 50, 52 which can, as a result of human error, result in dis-bonding of the factory-applied coatings which is highly undesirable. Also, the induction heater plates 138, 142 only heat a 0.3 mm skin of the field joint rather than all of it. The steel heats more quickly. The applicator machine 100 makes more economical use of energy.

The invention claimed is:

1. A process for heating and coating a section of a pipeline, the process comprising the steps of:
    disposing a frame configured to rotate about a section of pipeline to be heated and coated;
        disposing an induction coil adjacent to the section of pipeline, the induction coil defining an aperture;
        directing a coating material applicator to spray coating material to the section of pipeline;
        rotating the frame, the induction coil and the coating material applicator as a unit around the section of pipeline while simultaneously supplying alternating electrical power to the induction coil to heat the section of pipeline; and
        spraying the coating material through the aperture to the section of pipeline; wherein the induction coil defines the aperture by surrounding it.

2. The process of claim 1, wherein the aperture is an elongate aperture.

3. The process of claim 2, wherein the coating material applicator sprays coating material with a plurality of spray nozzles arranged in a row.

4. The process of claim 3, wherein the nozzles spray coating material in a substantially radial direction with respect to the section of pipeline.

5. The process of claim 1, wherein the induction coil heats a partially cylindrical section of pipeline elongate with respect to a longitudinal axis of the pipeline.

6. The process of claim 1, wherein the process comprises heating factory-applied coating of the section of pipeline with a radiant heater arrangement disposed upon the frame.

7. The process of claim 1, wherein the process comprises evacuating and collecting waste coating material from an enclosure surrounding the section of pipeline.

8. The process of claim 1, wherein the process comprises spraying at least one of the group comprising powder coating material fusion bonded epoxy powder material, and chemically modified polypropylene powder material.

9. The process of claim 1, wherein the surrounding is a complete encirclement.

10. The process of claim 1, wherein the induction coil is electrically coupled to a first terminal at one end and electrically coupled to a second terminal at a second end.

11. The process of claim 10, wherein the induction coil defines the aperture by surrounding it.

12. The process of claim 11, wherein the surrounding is a complete encirclement.

13. The process of claim 1, wherein the induction coil is a single coil.

14. The process of claim 13, wherein the induction coil defines the aperture by surrounding it.

15. The process of claim 14, wherein the surrounding is a complete encirclement.

16. A process for heating and coating a section of a pipeline, the process comprising the steps of:
    disposing a frame configured to rotate about a section of pipeline to be heated and coated;
        disposing an induction coil adjacent to the section of pipeline, the induction coil including an outer profile which surrounds a central aperture;
        directing a coating material applicator to spray coating material onto the section of pipeline;
        rotating the frame, the induction coil and the coating material applicator as a unit around the section of pipeline while simultaneously supplying alternating electrical power to the induction coil to heat the section of pipeline; and
        spraying the coating material through the aperture to the section of pipeline.

17. The process of claim 16, wherein the induction coil is in the form of a plate.

18. The process of claim 16, wherein the central aperture is an elongate aperture.

* * * * *